US012617072B2

(12) United States Patent
Sanchez

(10) Patent No.: US 12,617,072 B2
(45) Date of Patent: May 5, 2026

(54) INTEGRATED DRYWALL FINISHING TOOL ORGANIZER WITH CLEANING SYSTEM

(71) Applicant: Macario Sanchez, Pembroke Pines, FL (US)

(72) Inventor: Macario Sanchez, Pembroke Pines, FL (US)

( * ) Notice: Subject to any disclaimer, the term of this patent is extended or adjusted under 35 U.S.C. 154(b) by 9 days.

(21) Appl. No.: 18/739,182

(22) Filed: Jun. 10, 2024

(65) Prior Publication Data

US 2025/0375872 A1 Dec. 11, 2025

(51) Int. Cl.

| | |
|---|---|
| ***B25H 3/04*** | (2006.01) |
| ***B65D 25/02*** | (2006.01) |
| ***B65D 25/22*** | (2006.01) |
| ***B65D 25/28*** | (2006.01) |
| ***E04F 21/165*** | (2006.01) |

(52) U.S. Cl.

CPC ............... *B25H 3/04* (2013.01); *B65D 25/02* (2013.01); *B65D 25/22* (2013.01); *B65D 25/282* (2013.01); *E04F 21/165* (2013.01)

(58) Field of Classification Search

CPC ...... B65D 25/02; B65D 25/22; B65D 25/282; B25H 3/00; B25H 3/04; E04F 21/165

USPC ................................ 206/349, 373; 211/70.6

See application file for complete search history.

(56) References Cited

U.S. PATENT DOCUMENTS

| | | | | |
|---|---|---|---|---|
| 4,930,628 | A * | 6/1990 | Bridges | B25H 3/003 220/482 |
| 5,238,106 | A * | 8/1993 | Nguyen et al. | A47L 17/00 206/362.1 |
| 5,626,272 | A * | 5/1997 | Klemansky | B44C 7/02 224/232 |
| 6,305,498 | B1 * | 10/2001 | Itzkovitch | B25H 3/00 182/155 |
| 6,802,715 | B1 * | 10/2004 | Wotton | B44D 3/04 434/84 |
| 2004/0040917 | A1 * | 3/2004 | Lopinto | B25H 3/04 211/70.6 |
| 2006/0201397 | A1 * | 9/2006 | Sackman | B25H 3/06 108/38 |
| 2019/0143502 | A1 * | 5/2019 | Aguilar | B25H 3/04 211/70.6 |

FOREIGN PATENT DOCUMENTS

| | | | |
|---|---|---|---|
| JP | H0769000 | A * | 3/1995 |
| JP | 2005118500 | A * | 5/2005 |

* cited by examiner

*Primary Examiner* — Stephen F. Gerrity

(57) ABSTRACT

The invention provides a tool organizer specifically designed for drywall finishers. It incorporates a rectangular base board with a front surface featuring multiple storage pockets for holding various tools. A water reservoir tube, affixed to the top edge of the base board, enables controlled moistening of a foam or sponge pad located on one side edge. An opposing side edge features a squeegee for pre-cleaning tasks. A foldable element at the bottom edge of the base board acts as a kickstand for supporting the organizer in a slanted position. The invention aims to integrate tool storage and cleaning functionalities for drywall finishing tasks.

13 Claims, 4 Drawing Sheets

INTEGRATED DRYWALL FINISHING TOOL ORGANIZER WITH CLEANING SYSTEM

CROSS REFERENCE TO RELATED APPLICATIONS

The present invention relates generally to the field of construction tools and accessories. More specifically, the invention pertains to an organizer designed for use by drywall finishers, combining both tool storage and cleaning functionalities.

BACKGROUND

Field of Invention

In the construction industry, particularly in the drywall finishing sector, achieving efficient tool organization and maintaining the cleanliness of putty knives poses ongoing challenges for professionals known as tapers or drywall finishers.

The process of taping and finishing in the drywall finishing industry involves the use of a putty or compound material, commonly known as 'compound', 'joint compound' or 'drywall putty'. This compound is used to fill and level joints, cracks, and damaged areas in drywall, creating an even surface ready for subsequent sanding and application of paint or other decorative coatings. Putty or compound is usually composed of a mixture of gypsum, polymers and other additives that allow for easy application and quick drying.

To accomplish these tasks, specialists, or taper finisher workers, turn to a plethora of hand tools such as putty knives of different sizes, utility knives, tape measures, pliers, snips, rasps, and more. In this context, our tool organizer focuses on providing a specific and orderly place to house only the essential hand tools needed to carry out a given task, having only the most indispensable tools at hand at that precise moment ensuring efficient management of the tools required for a high-quality job.

Worksite conditions often present logistical obstacles for tool storage and sanitation, as the environment is frequently cluttered and hard to navigate. Moreover, the task of drywall finishing demands a high degree of precision, making the cleanliness of tools such as putty knives a critical factor in the overall quality of the finished work.

Manual cleaning methods are the prevailing norm and they bear several limitations. Tapers traditionally utilize water-filled buckets with sponges to clean putty knives, an approach that tends to consume excessive amounts of water. This excessive water usage not only raises environmental concerns but also adds to operational inefficiency. Furthermore, this method of cleaning becomes problematic in hard-to-reach or elevated areas, where carrying a water-filled bucket may be impractical or hazardous. Also this organizer can be in addition to drywall finishers, it can be used by: Hobbyists, Makers, Enthusiasts, garage, DIYers, artists, Etc.

Another common practice involves scraping off compound residues from putty knives before moistening them with a sponge or cloth for further cleaning. This approach minimizes water usage, however, it introduces a multi-step cleaning process that can be time-consuming and less efficient. It is also worth noting that these residues dry quickly and once dried, become significantly harder to remove. Even minor residues can impact the quality of the finish by leaving marks, making timely and effective cleaning imperative for the success of the project.

Existing tool organizers seldom address these complexities. They may offer storage solutions, but the problem is that the worker there finds a pile of tools all scrambled, which makes it impossible to easily choose the ones he needs at the moment, and at that time he only needs a few of them. Thus, tapers often find themselves needing to create makeshift arrangements, which only serve as a temporary solution and do not fully address the limitations described above. In summary, there is a notable absence of specialized equipment that combines both tool organization and efficient cleaning mechanisms for putty knives in drywall finishing applications. This gap in the market represents a clear need for a solution that can streamline tool management and cleaning in a more effective manner.

It is within this context that the present invention is provided.

SUMMARY

The present invention relates to a tool organizer specifically designed for drywall finishers. The invention incorporates both storage and cleaning functionalities into a single device. The principal components include a rectangular base board, a water reservoir tube, a foam or sponge pad, a squeegee, and a foldable kickstand.

In some embodiments, the front surface of the rectangular base board is designed with wide pockets to accommodate various tools commonly used in drywall finishing, such as putty knives, tape measures, hammers, pliers, snips, staples, utility knives, tape measures, and Drywall rasps. This feature aims to provide organized storage, thereby mitigating clutter and enhancing the ease of access to essential tools. Each pocket may correspond to a specific tool.

In some embodiments, the water reservoir tube is transparent and spans the width of the top edge of the base board. The tube has an inlet for water addition and is equipped with an exterior button. When the external button is pressed it pushes air inside the water container. Since the container is sealed the action causes a vacuum which makes that when pressed it pushes the water to moisten the foam or sponge pad. This mechanism provides a controlled distribution of water, reducing wastage while ensuring that the sponge remains adequately moist for effective cleaning.

In some embodiments, the foam or sponge pad is coupled to a first side edge of the base board. It receives water from the reservoir tube and serves as a cleaning medium for the putty knives. By simply wiping the putty knife on the moistened foam or sponge pad, residues can be efficiently removed.

In some embodiments, a squeegee is located on the opposing second side edge of the base board. The squeegee serves to remove excess compound from putty knives before they are cleaned with the moistened sponge. This pre-cleaning step aids in reducing the amount of compound residues that would otherwise accumulate on the sponge.

In some embodiments, a foldable element is attached to the bottom edge of the base board, which can be transformed into a kickstand. This feature allows the organizer to be positioned in an upright but slanted manner, providing stability when placed on flat surfaces.

In some embodiments, additional features like robust hooks for hanging Bluetooth speakers and designated spaces for cellular phone storage are included. These features aim to provide convenience and quick access to auxiliary items that may be used during drywall finishing tasks.

The organizer also has pockets to store small items such as pencils, markers, car keys, small notebook. These items are easily lost when they are needed most.

This organizer also has large pockets on the front and back or larger "wallets" or "compartments" that serve to store sandpaper, sandpaper of sponges of different sizes The invention aims to address the existing limitations in the drywall finishing sector by offering a specialized organizer that combines tool storage and cleaning functionalities in an integrated manner.

BRIEF DESCRIPTION OF THE DRAWINGS

Various embodiments of the invention are disclosed in the following detailed description and accompanying drawings.

Figure 1:
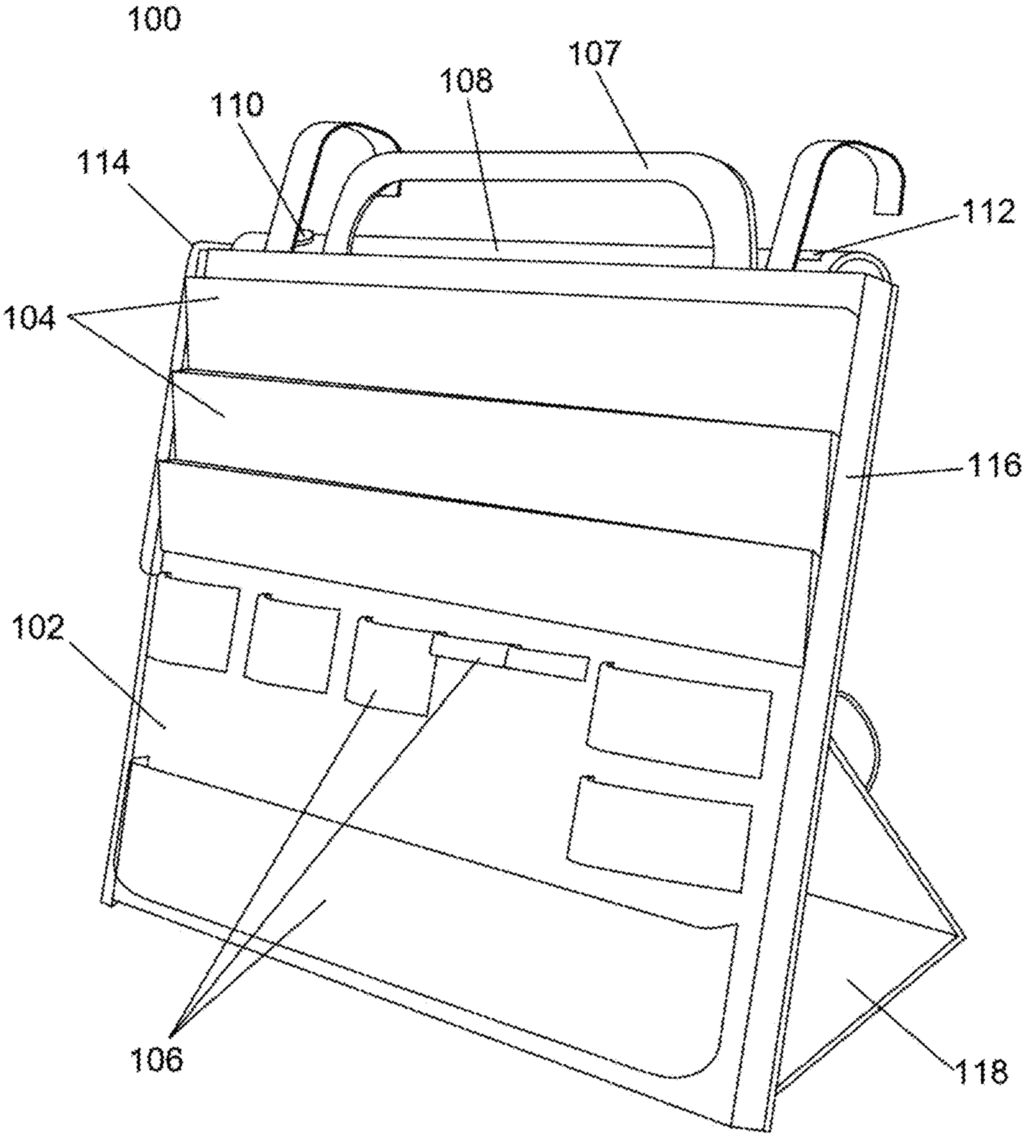
FIG. 1 depicts a front view of the organizer device tailored for use in the drywall finishing industry.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention.

As used herein, the term "and/or" includes any combinations of one or more of the associated listed items.

As used herein, the singular forms "a," "an," and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

DESCRIPTION OF DRAWINGS

The present invention provides a tool organizer designed to address the needs of professionals in the drywall finishing industry.

Our putty knives and tools organizer has been specifically designed to meet the needs of drywall workers, especially "taper-finishers." These professionals are commonly involved in projects that require the use of elevated platforms such as the "scissor lift" or the "boom lift" due to the heights involved. In this context, our product becomes of paramount importance as it enables workers to carry only the essential tools for the ongoing task and provides a convenient method for hanging them on any of these platforms, or in any utility cart for worker construction available in the market, or leave on the floor, thanks to kickstand or folding system or hung on the wall. That's to say, in that order of ideas, when the worker is on that platforms, he has the appropriate tools for certain tasks within reach of his hand without having to throw them on the ground.

It is crucial to note that "taper-finisher" drywall workers use a wide variety of tools, including putty knives of various sizes, a tape measure, screwdriver, pliers, staples, utility knives, sandpaper, and sponges of various sizes, among others. Obviously, our organizer does not aim to carry all these tools but rather offers a solution that allows users to carry the appropriate tools for the specific task at hand. Workers carry a game-box with all their tools, and our organizer efficiently selects the tools needed at that moment.

It's worth highlighting that "taper-finisher" drywall workers perform a range of tasks related to their job, such as sanding, installing corner beads on wall corners, repairing scratches, patching, and more. Each of these tasks requires a different set of tools, and our organizer ensures that these tools are readily available and ready for use.

It's important to emphasize that while our organizer is highly tailored to the needs of "taper-finisher" drywall workers, it is not limited to this group. Its versatility and functionality make it suitable for a broader audience, including DIY enthusiasts, Makers, hobbyists, artists, craftsmen, garage lovers and others.

The invention comprises a rectangular base board featuring a variety of elements that facilitate both the storage and cleaning of tools commonly used in drywall finishing. The front surface of the base board is equipped with multiple pockets for holding a range of tools, thereby aiding in tool organization. Additionally, the invention incorporates a water reservoir tube affixed to the top edge of the base board. This reservoir is in fluid communication with a foam or sponge pad situated on the first lateral edge of the base board. A squeegee element is affixed to the opposing second lateral edge. Further, a foldable element is attached to the bottom edge of the base board, enabling the organizer to be supported in a slanted position when deployed. The following detailed description will expound upon the various components and their functionalities, and will make reference to accompanying patent drawings to illustrate specific example implementations.

Figure 2:
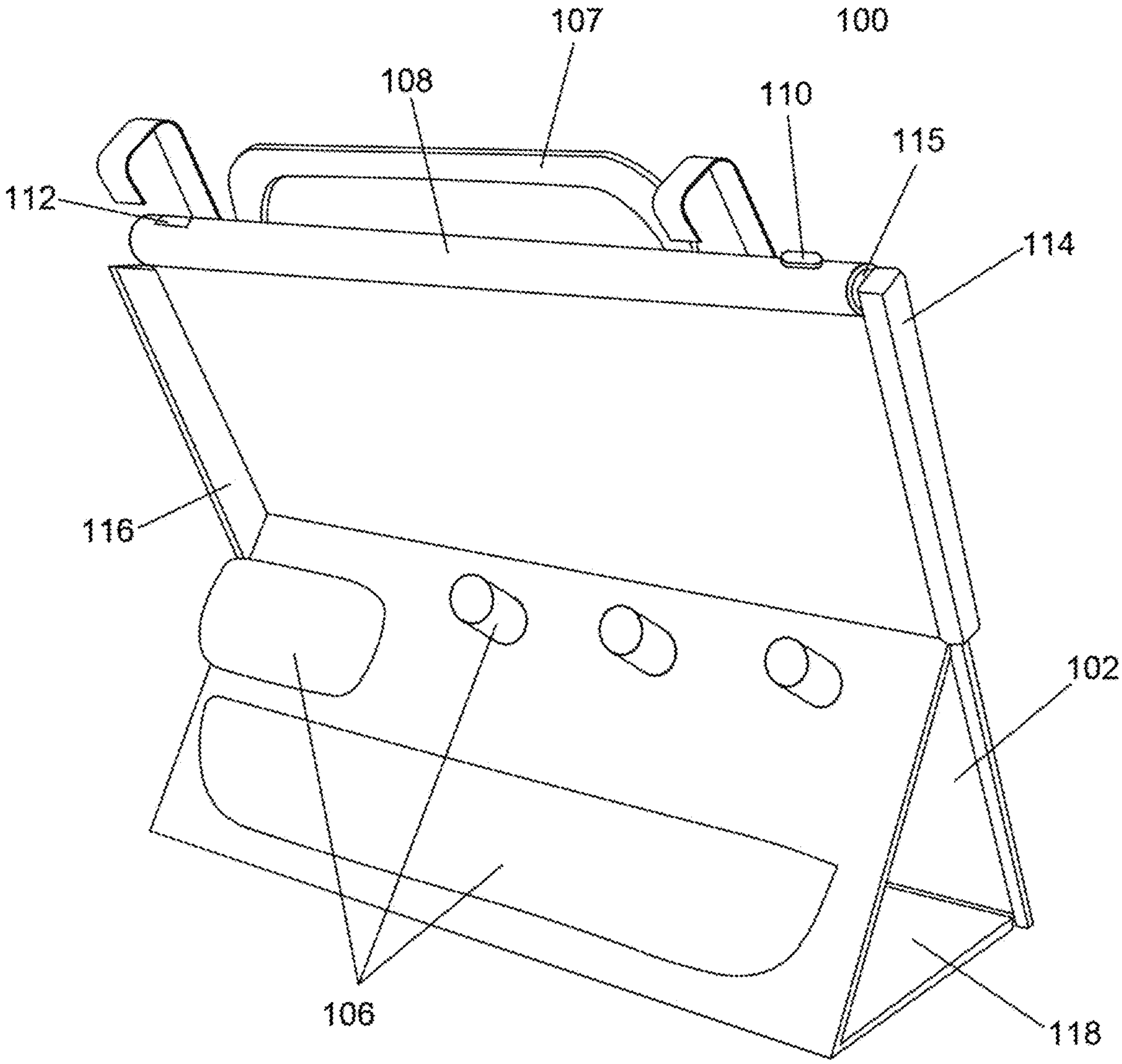
FIG. 2 presents a rear perspective of the same organizer device, showcasing additional features and storage configurations.

Referring to FIG. 1 and FIG. 2, there is illustrated an organizer device 100 configured for use in the drywall finishing industry. The device 100, as seen from both front and rear perspectives, exhibits a configuration designed to optimize the workflow of drywall professionals.

The organizer device 100 incorporates a rectangular base board 102 which establishes the foundational structure of the device. Situated on the front surface of the base board 102 are multiple putty knife pockets 104, specifically fashioned to securely hold putty knives. Adjacent to these pockets 104, further storage compartments 106 for various other tools are also provided. These compartments 106 are designed to receive various tools such as tape measures, knives, etc, that might be necessary for the drywall finishing process.

A handle 107 is situated at the top of the base board 102 to enable easy carrying of the organizer 100 and for it to be hung on hooks.

Positioned at the top of the organizer device 100 is a water reservoir tube 108. This tube 108 is equipped with an external button 110, enabling controlled release of water, and an inlet 112, which allows for refilling the reservoir when required.

On the left lateral edge of the base board 102, a sponge 114 is affixed. This sponge 114 can be used for cleaning or wetting purposes during drywall finishing operations. The end of the tube 108 that abuts against the sponge has a fine mesh structure 115 that allows water in the tube to moisten the sponge, while preventing excessive amounts from passing through.

On the opposite, right lateral edge of the base board 102, a squeegee 116 is attached, which can be employed for spreading or smoothing materials on a drywall surface.

To provide stability and a desired orientation for the organizer device 100 during use, a kickstand 118 is affixed to the bottom edge of the base board 102. The kickstand 118 enables the organizer 100 to be propped up in a slanted position, offering easy access to the tools stored therein.

Figure 3:
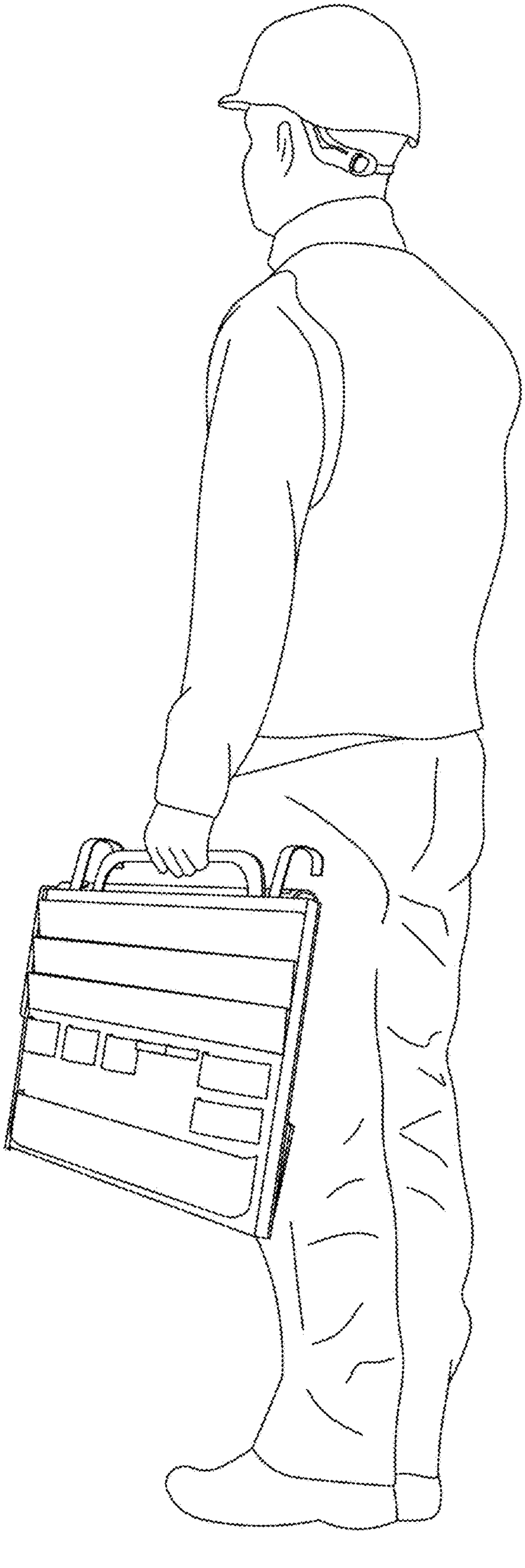
FIG. 3 illustrates a man holding an example putty organizer device by the handle in a folded configuration.

FIG. 3 illustrates a man holding an example putty organizer device by the handle in a folded configuration.

Figure 4:
FIG. 4 illustrates the example putty organizer device being hung on a caddy by the hooks.

FIG. 4 illustrates the example putty organizer device being hung on a caddy by the hooks.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the organizer and cleaning device have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tool organizer for drywall finishing, comprising:

a rectangular base board having a front surface;

a plurality of storage pockets disposed on said front surface of said rectangular base board for holding tools;

a water reservoir tube attached to a top edge of said rectangular base board, said water reservoir tube featuring an inlet and an external button;

a foam or sponge pad affixed to a first lateral edge of said rectangular base board, said foam or sponge pad being in fluid communication with said water reservoir tube;

a squeegee element affixed to a second lateral edge of said rectangular base board, opposite said first lateral edge; and a foldable kickstand element coupled to a bottom edge of said rectangular base board, said foldable kickstand element adapted to support said base board in a slanted orientation when deployed.

2. The tool organizer of claim 1, wherein said water reservoir tube is transparent.

3. The tool organizer of claim 1, wherein said foam or sponge pad is moistened by activation of said external button.

4. The tool organizer of claim 3, wherein said external button is configured to allow a predetermined amount of water to pass through when said external button is pressed.

5. The tool organizer of claim 1, further comprising additional storage means disposed on said front surface for holding tools selected from the group consisting of tape measures, hammers, utility knives, staplers, and scissors.

6. The tool organizer of claim 5, wherein said additional storage means are formed integrally with said front surface of said rectangular base board.

7. The tool organizer of claim 1, wherein said squeegee element is comprised of a material selected from the group consisting of steel, brass, and aluminium.

8. The tool organizer of claim 1, wherein said water reservoir tube spans the entire width of said rectangular base board.

9. The tool organizer of claim 1, wherein said water reservoir tube has a capacity of 250 ml.

10. The tool organizer of claim 1, further comprising a hook element configured for hanging items such as Bluetooth speakers.

11. The tool organizer of claim 1, further comprising a designated storage area for a cellular phone.

12. The tool organizer of claim 1, wherein said foldable kickstand element is attached to said bottom edge of said rectangular base board via a hinge mechanism.

13. The tool organizer of claim 1, wherein said plurality of storage pockets are configured to hold putty knives of various sizes.

* * * * *